(12) United States Patent
Van Luchene et al.

(10) Patent No.: US 9,440,151 B2
(45) Date of Patent: Sep. 13, 2016

(54) COLLECTIONS IN A VIRTUAL ENVIRONMENT

(75) Inventors: Andrew S. Van Luchene, Santa Fe, NM (US); Raymond J. Mueller, Palm Beach Gardens, FL (US)

(73) Assignee: Leviathan Entertainment, LLC, Santa Fe, NM (US)

( * ) Notice: Subject to any disclaimer, the term of this patent is extended or adjusted under 35 U.S.C. 154(b) by 2845 days.

(21) Appl. No.: 11/693,549

(22) Filed: Mar. 29, 2007

(65) Prior Publication Data

US 2007/0225071 A1 Sep. 27, 2007

Related U.S. Application Data

(63) Continuation-in-part of application No. 11/368,143, filed on Mar. 3, 2006, now Pat. No. 7,677,974, and a continuation-in-part of application No. 11/421,025, filed on May 30, 2006, now Pat. No. 7,690,990.

(60) Provisional application No. 60/727,121, filed on Oct. 14, 2005.

(51) Int. Cl.
| | | |
|---|---|---|
| A63F 13/00 | (2014.01) | |
| A63F 13/822 | (2014.01) | |
| A63F 13/79 | (2014.01) | |
| A63F 13/537 | (2014.01) | |
| A63F 13/35 | (2014.01) | |
| A63F 13/40 | (2014.01) | |
| A63F 13/30 | (2014.01) | |
| G06N 3/00 | (2006.01) | |

(52) U.S. Cl.
CPC .............. *A63F 13/822* (2014.09); *A63F 13/10* (2013.01); *A63F 13/12* (2013.01); *A63F 13/35* (2014.09); *A63F 13/537* (2014.09); *A63F 13/79* (2014.09); *G06N 3/006* (2013.01); *A63F 2300/407* (2013.01); *A63F 2300/5553* (2013.01); *A63F 2300/65* (2013.01); *A63F 2300/807* (2013.01); *A63F 2300/8058* (2013.01); *A63F 2300/8082* (2013.01)

(58) Field of Classification Search
USPC ................ 463/42–43; 705/35, 39, 37, 7, 38; 709/225, 204
See application file for complete search history.

(56) References Cited

U.S. PATENT DOCUMENTS

| | | | |
|---|---|---|---|
| 6,009,460 A * | 12/1999 | Ohno et al. ................... | 709/204 |
| 6,057,856 A * | 5/2000 | Miyashita et al. ............ | 345/633 |
| 6,106,399 A * | 8/2000 | Baker et al. ................... | 463/42 |
| 7,249,090 B1 * | 7/2007 | Kirkpatrick .................... | 705/38 |
| 2002/0133592 A1 * | 9/2002 | Matsuda et al. ............... | 709/225 |
| 2003/0018563 A1 * | 1/2003 | Kilgour et al. ................ | 705/37 |
| 2003/0083916 A1 * | 5/2003 | Tracey et al. ..................... | 705/7 |
| 2005/0021444 A1 * | 1/2005 | Bauer et al. .................... | 705/37 |
| 2005/0246258 A1 * | 11/2005 | Bantz et al. .................... | 705/35 |
| 2006/0178970 A1 * | 8/2006 | Jung et al. ...................... | 705/35 |
| 2006/0184443 A1 * | 8/2006 | Erez et al. ....................... | 705/37 |
| 2007/0016500 A1 * | 1/2007 | Chatterji et al. ............... | 705/35 |
| 2007/0038559 A1 * | 2/2007 | Jung et al. ...................... | 705/39 |
| 2007/0066403 A1 * | 3/2007 | Conkwright .................... | 463/43 |

* cited by examiner

*Primary Examiner* — Milap Shah

(57) ABSTRACT

A virtual environment in which players are able to enter into financial transactions which result in a financial obligation such as a debt. If a player defaults on a debt, the debts may then be sold or otherwise transferred to a virtual collection agency, which may be able to mete out a consequence to the defaulting player. Alternatively, the consequence may be meted out by the game server or other entity.

8 Claims, 3 Drawing Sheets

FIG. 3

Run a massive multiplayer online game that is operable to simultaneously support a plurality of players via a plurality of video game devices Provide a virtual environment wherein players can interact with each other and the environment via avatars Provide a mechanism whereby players can incur debts through financial transactions in the virtual environment Determine if a player has defaulted on a debt incurred in the virtual environment Provide a collections process whereby the player is forced to suffer a consequence until the debt is repaid

COLLECTIONS IN A VIRTUAL ENVIRONMENT

PRIORITY CLAIM

The following application is a continuation in part of U.S. patent application Ser. No. 11/368,143, "Video Game Methods and Systems" filed Mar. 3, 2006; and Ser. No. 11/421,025, "Financial Institutions and Instruments in a Virtual Environment," filed May 30, 2006, which claims the benefit of U.S. Provisional Application Ser. No. 60/727,121 "Methods, Processes, and System to Enhance a Player Experience of a Video Game" filed Oct. 14, 2005, which is hereby incorporated by reference in their entirety for all purposes.

BACKGROUND

Video games which are accessible to multiple players via a server or peer to peer network are well known. For example, hundreds of thousands of players access games known as massive multi-player online games (MMOGs) and massive multi-player online role playing games (MMORPGs). Players of these games customarily access a game repeatedly (for durations typically ranging from a few minutes to several days) over a given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community.

It would be advantageous to provide improved methods and apparatus for increasing the enjoyment and/or longevity of video games including, but not necessarily limited to MMOGs and MMORPGs.

BRIEF DESCRIPTION OF THE DRAWINGS

FIG. 3 is a flowchart of a process according to an embodiment of the present disclosure.

DETAILED DESCRIPTION

Massive multi player online games (MMOGs) or massive multi-player role-playing games (MMORPGs) are computer game which are capable of supporting hundreds, thousands, or millions of players simultaneously. Typically, this type of game is played in a giant persistent world where the game continues playing regardless of whether or not real players are logged in. Players commonly access these games through a network such as the Internet, and may or may not be required to purchase additional software or hardware in order to play the game. Such networks allow for people all over the world to participate and interact with each other in a virtual environment. The present disclosure provides systems and methods which contribute to the evolution and longevity of such a game.

Figure 1:
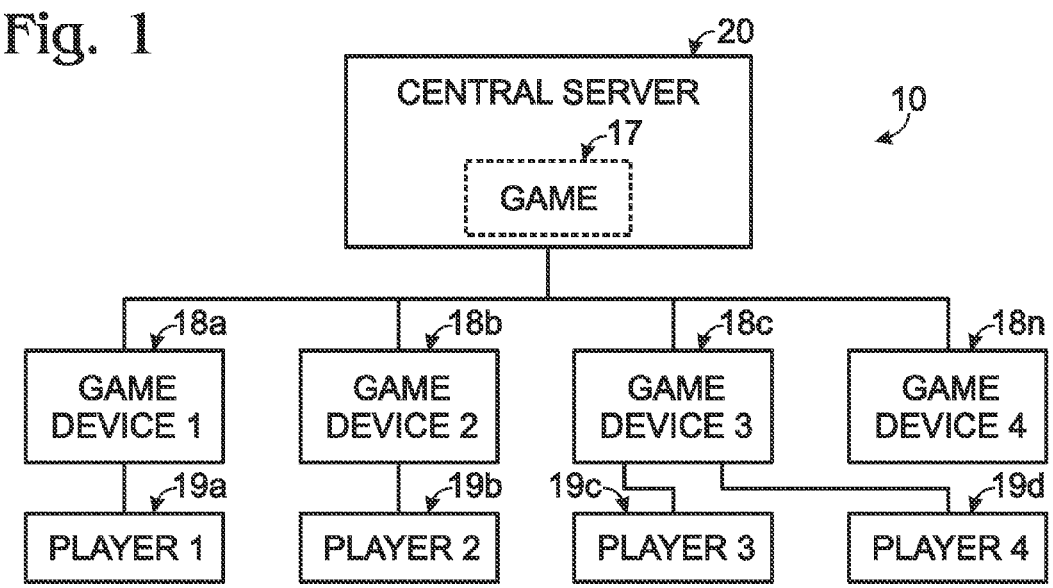
FIG. 1 is a block diagram depicting a network according to an embodiment of the present disclosure.

The herein described aspects and drawings illustrate components contained within, or connected with other components that permit play in the virtual environment. It is to be understood that such depicted designs are merely exemplary and that many other designs may be implemented to achieve the same functionality. Any arrangement of components to achieve the same functionality is effectively associated such that the desired functionality is achieved. FIG. 1 provides an exemplary network which may be used to support a virtual environment.

Referring to FIG. 1, a network system 10 according to one embodiment includes a central server 20 in communication with a plurality of video game playing units 18. Those of ordinary skill in the art will appreciate that any number of video game playing units may be in communication with the central server. Typically, the number of video game playing units changes at various times as players join games and as players stop playing games. Similarly, more than one server may operate to coordinate the activities of the video game playing units, as is well known in the art.

Central server 20 may comprise any computing device (e.g., one or more computers) capable of communicating with other computing devices. The server 20 typically comprises a processor which is in communication with a storage device, such as an appropriate combination of RAM, ROM, hard disk, and other well known storage media. Central server 20 may comprise one or more personal computers, web servers, dedicated game servers, video game consoles, any combination of the foregoing, or the like.

Each video game device 18 may comprise any device capable of communicating with central server 20, providing video game information to a player, and transmitting the player's desired actions to the central server. Each video game device typically comprises a processor which is in communication with a storage device, such as an appropriate combination of RAM, ROM, hard disk, and other well known storage media. Suitable video game devices include, but are not limited to, personal computers, video game consoles, mobile phones, and personal data assistants (PDAs).

Some or all of video game 17 can be stored on central server 20. Alternatively, some or all of video game 17 may be stored on the individual video game devices 18. Typically, the video game devices are able to communicate with one another. Such communication may or may not be facilitated by central server 20. Accordingly, a player 19a accessing video game 17 via game device 18a may be able to play with a player 19b accessing video game 17 via game device 18b. As shown, it may be possible for multiple players (e.g. 19c, 19d) to access central server 20 via the same game device (e.g. 18c).

Regardless of whether video game 17 is stored on central server 20 or video game devices 18, server 20 is typically configured to facilitate play of the game between multiple game players.

Those having skill in the art will recognize that there is little distinction between hardware and software implementations. The use of hardware or software is generally a choice of convenience or design based on the relative importance of speed, accuracy, flexibility and predictability. There are therefore various vehicles by which processes and/or systems described herein can be effected (e.g., hardware, software, and/or firmware) and that the preferred vehicle will vary with the context in which the technologies are deployed.

At least a portion of the devices and/or processes described herein can be integrated into a data processing system with a reasonable amount of experimentation. Those having skill in the art will recognize that a typical data processing system generally includes one or more of a system unit housing, a video display device, memory, processors, operating systems, drivers, graphical user interfaces, and application programs, interaction devices such as a touch pad or screen, and/or control systems including feedback loops and control motors. A typical data processing system may be implemented utilizing any suitable commercially available components to create the gaming environment described herein.

According to various embodiments:

Virtual Purchase Total may include the total virtual cash or cash equivalent needed to purchase a virtual item or attribute at or from a virtual shop or bank in a MMPOG.

Virtual Taxes may include a percentage, flat fee or combination of percentage/flat fee applied to activity in a virtual world or massive multiplayer online game.

Virtual Title may include a software module or application or any portion thereof and/or a record in a database that indicates, stores, tracks or otherwise documents the virtual owner or owners of one or more virtual items. In an embodiment, c. Characters cannot use a virtual item unless they are first registered on the virtual title. A fee can be paid to transfer title of the item to another character.

Virtual Activity may include any activity of a player or player character that can be measured by the game server or other application.

Notification methods may include but are not limited to:
a. Email message
b. Telephone or cell phone
c. Instant Message
d. Text Message
e. Physical Mail
f. Writing a record or entry to a file or database
g. Voice mail message
h. Pager
i. Graphic, text or audio message delivered by the game on screen to the receiving player and/or delivered by another character, or NPC
j. Any combination of any of the above.

Alert may include the transfer or storage of information or otherwise communicating with, by, between or among any two or more of the following, including, but not limited to any real or virtual: a) players, b) game owners, c) game or other servers, d) player characters, e) NPC's, f) exchanges, g) game devices or controllers, h) cell phone or other communications hardware and/or networks, i) databases, j) software applications, k) legal agencies, l) governing bodies, m) software interfaces, n) and/or any combination of any of the above, which may be initiated by and/or based upon an alert event or other action.

Alert Event may include any change in, of or to any condition or state, and includes any action, opposite action, unexpected action, desire for action, or failure to act, and thus Alert Event includes, but is not limited to any one or more of:

1. When or after any one or more variables or data changes or is expected or is about to change within a game application, service, API, communications network or one or more databases, or database variables or element, e.g., a balance is reached or exceeded, including, but not limited to:
    a. time a player or character account has been active or inactive
    b. number of complaints or compliments by other players/characters for a given player/character
    c. amount of time and/or quality and/or number of times a player or player character has provided assistance or other help or tutelage to another player and/or player character
    d. amount of time and/or quality and/or number of times a player or player character spends managing, directing or otherwise controlling one or more NPC's
    e. attributes and virtual assets or debts of the player/character
    f. player or character total or frequency of purchases of virtual cash outside or within the game environment
    g. number of loans and contracts that the character has outstanding and/or their balances
    h. payment history and timeliness of payments for any loans or other payment obligations, e.g., tax or other fee payment history
    i. guild or family of the player or character
    j. number of times the character has defaulted or paid timely on a loan or other contract
    k. age of the player account
    l. age of the player
    m. real world credit scores, points, creditworthiness or payment history
    n. experience level of the player or one or more of his characters
    o. annual income of the player or one or more of his character
    p. payment history of the character
    q. production level of the character, e.g., ability or historical performance in producing objects within the game
    r. Current assets or liabilities, e.g., net worth of a player character
    s. The number of active characters in a player account
    t. The size of the character's guild or family in the game environment
    u. The age of the account of the player
    v. The virtual transaction volume of the character or player
    w. Membership status of the character, e.g., premium member vs. basic member of the video game or credit card holder status, e.g., gold or platinum members
    x. Age of the video game or credit card account,
    y. Killing monsters in a game environment
    z. Joining a Guild in a game environment
    aa. Completing a quest in a game environment
    bb. Solving or completed a game parameter in a game environment
    cc. Paying a bill timely
    dd. Failure to pay a bill when due
    ee. Randomly
    ff. Any activity or outcome or expected or desired or undesirable outcome within the game or associated with the player's and/or the any one or more of the player character's financial condition (real or virtual) and/or the credit card(s) and/or credit line(s)
    gg. How many times the player or player character requests credit or such credit is checked or held or is otherwise encumbered
    hh. A range of amounts or values or reaching or falling below a threshold associated with any of the above (as appropriate)
    ii. When or after information is transmitted and/or shared (e.g. via a communications package or other mechanism) between two or more applications, game services, servers, financial institutions, or any other entities, e.g., a message sent between two servers to settle a debt or payment.

jj. When or after a step or procedure (e.g., of software, a script, a user-defined process) is executed, e.g. when a penalty or interest amount is charged to an account, or an action is taken by or within a game.

kk. When or after an application or service (e.g., a software service) is started, paused, stopped, proceeds to a certain point, or is changed.

ll. When or after an item becomes or may become available for use or sale by an NPC or Player Character and/or at any given point during construction of the item, e.g., at a construction milestone.

mm. When or after a character has reached or may reach a certain level or has started and/or completed a certain mission or game objective or goal within a mission.

nn. When or after a player has obtained or may obtain or fails to obtain a certain attribute or resource.

oo. When or after a player is logged into or out of the game or another participating game, e.g., when a friend logs into a particular game, and/or when a player remains logged in or out for a given period of time.

pp. When or after a character or NPC has been created, modified, harmed, killed or destroyed in a game, and/or some other action is taken by or otherwise affects or should have affected one or more player or player characters.

qq. When or after a player's account or any attribute of any player character is and/or any of his financial data or other information that may be or should have been changed, added to or removed, lost or damaged.

rr. When or after a price, fee, tax, or other financial amount changes or should have changed (e.g., increases or decreases or is established or eliminated, or is expected, calculated or projected to change).

ss. A trend changes or should or should not have changed or is expected to change, e.g., a particular rate of spending increases or decreases.

tt. A battle or wager is or should or should not have or is expected to be started, won or lost, or an interim objective is achieved or is not achieved.

uu. An object or service should or should not be or is made available for sale or the price changes or is about to or is otherwise expected to change.

vv. A marketing offer should or should not be or is generated, determined or presented.

ww. A player should or should not or otherwise joins or retires from a game.

xx. A player fails to or completes a task, level, challenge, duty, service, mission, etc.

yy. A new game or version of an existing game should or should not be or is brought online or offline or is available or not available for play.

zz. A game should or should not be or is or is expected to be turned off for servicing or is no longer available for play (temporarily or permanently, to some, certain or all players).

aaa. A tax amount or rate should be, should not be or is created, changed, deleted, reached, falls below or increased or decreased by an amount or percentage or may soon change or is expected to change.

bbb. An item or object is expected to and/or should or should not be or is otherwise identified, stolen, found, created, bought, sold, encumbered, used, deployed, returned, compromised, modified or destroyed.

ccc. One more players and/or servers and/or applications wishes, determines or requests or should or expected to wish, determine or request to notify another one or more players and/or servers and/or applications via an alert message or messages and/or when or if a player responds or fails (or should fail) to respond to an alert.

ddd. When a player is expected or should or should not be or is logged in to a system (e.g., the virtual world, an external instant messenger system).

eee. When a date and/or time approaches, is reached or is past.

fff. When a virtual auction should or should not or does start or is ending or has ended.

ggg. When an item within a virtual auction should or should not or does come up for bid or has been sold or has not been sold.

hhh. When payment is made or is or will, or should or should not become due for a virtual purchase or on any loan and/or when one or more payments are missed, or based upon a payment term, condition or type.

iii. When a loan penalty or interest is or should or should not be applied.

jjj. When or after a reward or point should or should not be or is assigned to a financial account or when or after a certain threshold is or should or should not be reached, e.g., when a player accrues sufficient points to purchase a desired item.

kkk. When a player should or should not or is expected or otherwise opens, closes or applies for a loan and/or makes or fails to make a payment on a loan and/or makes the wrong or unexpected payment on a loan.

lll. When the credit score, credit history or risk profile of a player or player character is updated or changed or changed a certain percentage.

mmm. When or after one or more player characters, NPC's or any other real or virtual person or item moves from one (real or virtual) position to another, or from one position to a specific position, or plans to use, applies for, is expected to use or fail to use, or uses one path vs. an expected or required path, or deviates from one path to another path, or proceeds faster or slower than required or expected or not at all.

nnn. The negative or opposite of any one or more of the forgoing.

ooo. A partial occurrence or greater occurrence or outcome of any one or more of the forgoing.

ppp. A change in the rate or frequency of any one or more of the forgoing.

qqq. And/or any one or more or any combination of any of the above, which are collectively referred to as an "alert event".

Credit Card—includes a credit instrument issued by a real or virtual world institution to a player that allows the player to make purchases by providing an account identifier (e.g. a credit card number) rather than cash or other currency. An example is a credit card like those issued by Visa, MasterCard, or American Express. For the purposes of the present disclosure, the term "Credit card" is intended in a very broad sense and is not limited to those situations in which a player's purchases are made on credit (i.e. where payments for those purchases is not due until a later time) but also includes financial instruments such as debit cards, check cards, lines of credit and the like.

Virtual credit card—a financial instrument issued in a virtual environment that acts in the virtual environment for virtual currency the way a real world credit card acts in the real world for real currency.

Real Cash Value—the value in real dollars of the virtual currency. This value can be determined by multiplying the value of a virtual currency amount by the current exchange rate to real dollars.

Total virtual obligation amount—includes the total amount of the virtual financial obligation(s) associated with a player character's account.

Virtual Contract—an enforceable agreement between a first player character and either another player character, a game server, or a third party. Some examples of virtual contracts are provided in U.S. Provisional Patent Application Ser. No. 60/652,036, and U.S. patent application Ser. Nos. 11/279,991, 11/621,050, 11/355,232, and 11/624,662 each of which are hereby incorporated by reference in its entirety.

Virtual—in a video game environment or other intangible space.

Virtual World—a world created in an online game such as World of Warcraft, or a virtual community such as Second Life, Eve or There.com.

Virtual Creditor—a first player character or other entity who is owed a virtual obligation by a second player character.

Virtual Credit Score—a score given to player characters in a video game based on one or more of the following criteria: the virtual assets they possess, the age of the character account, the type of account, e.g. basic or premium, the available credit line of the credit card associated with the account, the existing virtual financial obligations of the player character account, the player character's payment history including days to pay, amounts overdue or delinquent, and/or the player character's real world credit score, and/or the factors used in the real world to determine a credit score.

Virtual Financial Account—a virtual account issued to a player character by a virtual bank, game server or third party where virtual cash can be deposited and withdrawn.

Virtual Financial Obligation—an agreement by a player character or entity to pay one or more game attributes to another player character, entity or game server.

Virtual Financial Intermediary—includes institutions such as, but not necessarily limited to, depository institutions, contractual savings institutions, and investment intermediaries which offer financial products and services for use within the virtual environment. The various financial intermediaries available in the virtual environment may each serve different or overlapping purposes and provide means for using, saving, borrowing and transferring currency.

Virtual Financial Obligation Value—the "in game" or virtual value of an obligation. For virtual cash (or other currency) the value may be stated as a virtual and/or real cash (or other currency) amount. For other game attributes, the value can be determined by generating a virtual cash market value for the item based on the current value in an online marketplace or exchange.

Billing Information—includes any information pertaining to billing a player for activities related to a game or virtual environment, including, but not necessarily limited to, playing the game, accessing the game, purchasing goods or services, etc. Billing information may include such real world information as a billing address, credit card account number, bank account number, pay pal account number or other payment facilitator, or the account number of any other financial entity providing a real world credit line or any other payment-related information.

Character or "player character"—a persona in a video game that is created and controlled by a player.

Avatar—the virtual representation of a player character.

Character Account—an account that tracks character attributes.

Character Attribute—any quality, trait, feature or characteristic a particular Character can have that is stored in the corresponding Character Account. Character Attributes may include, but are not be limited to:
1. A character score
2. A virtual object
3. The physical appearance of a character
4. An Emblem or Mark
5. A synthetic voice
6. Virtual Currency
7. Virtual Help Points or Credits
8. The ability to join groups of other players at a later time
9. A score for subsequent matching of later game parameters
10. A relationship with another character
11. A genetic profile or makeup
12. A skill or skill level
13. A ranking Character Life—a fixed or variable, finite or infinite period of virtual or real world time that a player character can exist in a game environment.

Character Skills—includes game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

Computer Generated (CGC) or Non-Player (NPC) Character—any character that is controlled by the game system and/or a computer program and/or rules established by the game system and/or a player and not by a player on a continuous basis.

Game performance parameter—includes any aspect of a Video Game by which a player character's performance can be measured. Game Parameters shall include, but not be limited to:
1. Completing all or part of a mission
2. Playing for a certain period of time
3. Winning a match against another player character or computer generated character
4. Reaching a certain level or score
5. using or obtaining an ability or technology
6. kill/death ratios
7. obtaining, creating or modifying an object
8. solving a puzzle
9. accuracy with weapons
10. effective use of the proper weapon
11. killing a certain character/creature
12. getting through or to a certain geographic area
13. decreasing or increasing Karma Points
14. getting, buying, exchanging or learning a new skill or player attribute
15. having a child
16. getting married
17. obtaining, buying, trading, producing or developing raw materials 18. producing goods or services
19. earning income
20. earning a higher rank in an army
21. winning an election among two or more player characters
22. achieving deity or other status
23. improving player character status or caste
24. assisting other player characters with any of the above
25. speed of accomplishing or changing the rate or trends of any or all of the above.

In-game Marketplace—a virtual environment where Characters can exchange items, attributes, or any other exchangeable game element.

Novice Player—any player who would generally be considered to be a "beginner" at playing the game, includes, for example, a player that is identified as requiring the help of an expert to complete a Game Parameter.

Player—a person who controls a character in a video game or other virtual environment; includes an individual who can register an account with a Video Game Central Server or within a peer-to-peer network and create Characters that can interact with other Characters in a Virtual Environment, and/or that can authorize a NPC to act on the player's behalf.

Player Account—a database, file, program, or the like that maintains player related information including, but not limited to, personal, billing, and character account information. The database, file, program etc. may be computer implemented and may reside on a Video Game Central Server or within a peer-to-peer network that hosts or manages a video game or other virtual environment.

Player Attribute—includes any attribute that can be applied to a player account. Player Attributes shall include, but not be limited to:

1. Real Currency.
2. Discount of monthly fees for playing game.
3. Monthly fee for playing a game.
4. Interest rates for use of or borrowing real or virtual cash amounts.
5. Global character attribute settings for all characters created by player across multiple games.
6. Rewards for encouraging another player to signup to play.

Video Game—a game played on a Video Game Consul that may or may not be networked to a Video Game Central Server or within a peer-to-peer network. The terms "video game" and "virtual environment" are used interchangeably.

Video Game Console—a device that allows a player to access a video game. A video game console may, but does not necessarily, comprising a CPU, memory and optional permanent storage residing at a player location that can allow for the playing of video games. Examples include, home PCs, Microsoft Xbox, and Sony Playstation.

Video Game Central Server—a CPU, memory and permanent or temporary storage that is in communication with or capable of communicating with multiple Video Game Consoles so that multiple players can access and play a video game. The multiple players may or may not be in different locations.

Numerous financial transactions for virtual environments have been described in, for example, U.S. patent application Ser. Nos. 11/559,158, 11/620,542, 11/535,572, 11/535,585, 11/624,659, 11/625,225, 11/625,229, and 11/676,848, each of which is hereby incorporated by reference. In a number of these applications, financial transactions wherein players or player characters are allowed to incur real or virtual debt with respect to transactions occurring in a virtual world are described. It will be appreciated that there may be times when a player or player character is unable to repay this debt. Accordingly, in an embodiment of the present invention, the invention provides for a Virtual Collection Agency within a virtual environment. In the event a player character defaults on a virtual or real loan, the credit card issuer, bank or other player character or entity holding the note or financial obligation, may opt to transfer part or all of such obligation to another player character, bank, or other lending institution, any or all of which may serve as a collection agency.

The collection agency may pay the note holder an up front fee and/or percentage of the total outstanding debt, in exchange for the potential future value of the final collected amount, i.e., a discount payment or other amount for the "transfer of paper", and/or may remit a percentage of the final collected amount to the note holder and retain the balance for its efforts. The collection agency may also take possession of the liens on any real or virtual property and/or take actual possession of same and either hold it until paid (i.e., akin to a pawn shop) and/or sell the assets to recover part or all of the loan.

When a player character signs up for a virtual credit card or enters into any other indebtedness or note, he may also be required by the lender to agree to permit such a transfer of his obligation, whether for collections on a default or otherwise.

Alternatively or additionally, a holder of a note or other indebtedness may sell or assign part or all of such loan or other debt in exchange for a portion or all of such note. In this way, lenders may reduce their risk and/or free up their credit lines so that they can focus on securing new loans.

According to some embodiments, the second player character can hire a loan officer that is an NPC or other player character to pursue and/or harass the first player character and force payment from him.

According to some embodiments, the bank could have NPC loan officers that it sends out to follow a player character with a delinquent loan. The delinquent player character would be followed by that NPC until he had paid his loan to the bank.

According to some embodiments, a player character avatar's appearance may be altered if there are any loans, outstanding loans, bad debts or late payments. For example, the avatar may have a "ball and chain" attached to its leg if there is a loan. The number, length, size, apparent or perceived weight or color of the ball and chain may be modified depending upon the number, size, length, interest rate, credit score, past payment performance, etc., of the player character's outstanding loans, and/or current virtual credit score. In this manner, other player characters could easily determine the current credit worthiness of any given player character. Optionally, other player characters could click on the avatar and/or, for example, the ball and chain or other indicia, and receive details about that player character's loans, credit score, payment history or other financial information. Such information may optionally only be viewable by those from whom the player character has applied for credit.

According to some embodiments, the bank can request that a player character with a delinquent loan be jailed if he is late with his payments According to an embodiment, the bank can request that a player character with a delinquent loan be jailed if he is late with or otherwise fails to make his payments when or as due. NPC or player bounty hunters can be hired to capture and jail delinquent player characters. The system can flag a player character account as delinquent, and bounty hunters can only capture avatars with such a delinquent status flag or other indication. NPC bounty hunters can be a class of NPC that can be created and or purchased in a limited quantity and or that can only be operated with a virtual license. Such licenses can be controlled and issued in limited or unlimited quantities by a game environment administrator or virtual government official. Management and purchase or license or rental of bounty hunter NPCs may require that a virtual entity has certain skills or other game attributes and/or may require the payment of a fee and/or a percentage of any amounts collected by any such NPC.

Player characters who elect to become bounty hunters or collection agents may require a permit, license, skill level, or game attribute to do so. Control, issuance, creation, and monitoring of such permits, licenses, skill levels, or game attributes can be managed by a game environment administrator or virtual government official. In certain embodiment, such permits, licenses, skills and/or attributes may require the payment of a fee and/or a percentage of any amounts collected. Fees may be based on the amounts due, the payment history or creditworthiness of the delinquent player/player character, prior defaults and/or difficulties posed and/or time required in previous defaults to collect debts from such defaulting party, and/or any combination of the forgoing.

According to various embodiments, bounty hunters can agree to capture a fugitive character who has an outstanding obligation based on a virtual contract that specifies real or virtual cash payment for fulfilling the obligation of capturing the delinquent NPC. Such payment or fee may be fixed or variable. For example, a bounty hunter might charge a flat fee while another bounty hunter might charge based upon a percentage of the expected or actual amounts collected/recovered.

In certain embodiments, a player character with one or more delinquent loans, may be limited in his ability to move within the game environment and/or may be limited in game access or may be otherwise restricted in any predetermined, or negotiated fashion. For example, he may be precluded from returning to a town in which is located a creditor, such as a bank, to whom he owes money or has been delinquent in payment.

According to various embodiments, collection agencies and/or bounty hunters or other parties (real or virtual) can bid against each other to take over an obligation that a bank or game server posts as available for assumption. Once an obligation has been taken over or otherwise assumed by a collection agency, the agency may be granted access to alterations that they can apply to the avatar of the character, e.g., visible alterations and/or voices, etc. Delinquent Contracts can be posted on an exchange where they can be purchased individually or in bundles by competing virtual collection agencies, bounty hunters and/or other agencies/third parties.

According to some embodiments, collection agencies can bid against each other to take over an obligation that a bank or game server posts as available.

Figure 2:
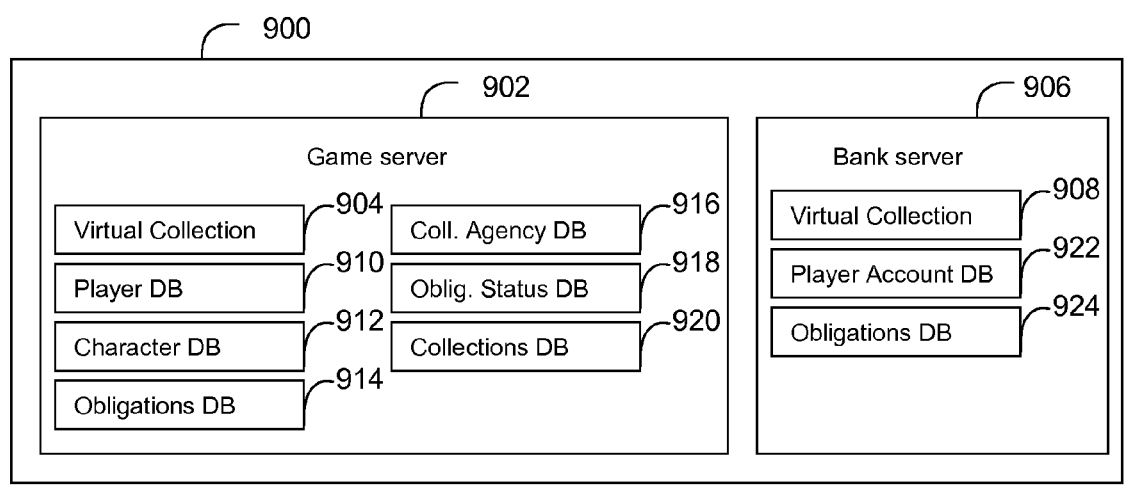
FIG. 2 is a block diagram depicting a system according to an embodiment of the present disclosure.

FIG. 2 provides a block diagram of a exemplary system 900 suitable for use with the above-described embodiments. As shown, system 900 includes a game server 902 which may host, for example, a virtual collection program 904. System 900 further includes a bank server 906, which may host, for example, a virtual collection program 908.

Game Server 902 may include a plurality of databases including, but not limited to, a player database 910, a player character database 912, an obligation database 914, a collections agency database 916, an obligation status database 918, and a collections database 920.

According to one embodiment, Player Database 910 may include data such as:
1. Player ID
2. Player Personal Information
3. Player Billing Information
4. Real World Credit Score
5. Player Characters 1-n According to another embodiment, Player Character Database 912 may include data such as:
1. Character ID
2. Character Credit Score
3. Character Assets and Attributes
4. Character Obligations
5. Obligation Status According to another embodiment, Obligation Database 914 may include data such as:
1. Obligation ID
2. Obligation Descriptor
3. Obligation Terms and Conditions
4. Obligation Penalties According to another embodiment, Collections Agency Database 916 may include data such as:
1. Collections Agency ID
2. Collections Agency Descriptor
3. Collection Types
4. Penalty Types
5. Collection Methods According to another embodiment, Obligation Status Database 918 may include data such as:
1. Obligation Status ID
2. Obligation Status Descriptor
3. Obligation Status Actions According to another embodiment, Collections Database 920 may include data such as:
1. Collection ID
2. Collection Agency ID
3. Player Character ID
4. Penalty Method
5. Collection Terms and Conditions Bank Server 906 may similarly host any number of suitable databases including, for example a player character account database 922 and an obligation database 924.

According to one embodiment, Player Character Account Database 922 may include information such as:
1. Player Character ID
2. Account ID
3. Obligation ID 1-n According to an embodiment, Obligation Database 924 may include information such as
1. Obligation ID
2. Player Character ID
3. Obligation Penalties
4. Obligation Terms and Conditions According to one embodiment, game server 902 may be configured to set up conditions for obligation Transfer at the time the obligation is created. Accordingly, game server 902 may be configured to:
1. Receive an obligation request from a player character
2. Determine conditions for obligation transfer (to a virtual collection agency)
3. Output conditions to the player character
4. Receive acceptance of conditions from the player character
5. Create Obligation for the player character According to one embodiment, game server 902 may be configured to:

1. Determine that an obligation is in default
2. Retrieve Conditions for Obligation Transfer
3. Transfer obligation to collection agency based on conditions According to another embodiment, game server 902 may be configured to:

1. Determine that an obligation in default based on conditions
2. Output offer to transfer obligation to multiple collection agencies
3. Receive acceptance of offer from a collection agency
4. Transfer Obligation to Collection Agency Of course it will be appreciated that the systems methods described herein are provided for the purposes of example only and that none of the above systems methods should be interpreted as necessarily requiring any of the disclosed components or steps nor should they be interpreted as necessarily excluding any additional components or steps. Furthermore, it will be understood that while various embodiments are described, such embodiments should not be interpreted as being exclusive of the inclusion of other embodiments or parts of other embodiments.

The invention is described with reference to several embodiments. However, the invention is not limited to the embodiments disclosed, and those of ordinary skill in the art will recognize that the invention is readily applicable to many other diverse embodiments and applications as are reflected in the range of real world financial institutions, instruments and activities. Accordingly, the subject matter of the present disclosure includes all novel and nonobvious combinations and subcombinations of the various systems, methods configurations, embodiments, features, functions, and/or properties disclosed herein.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each claim in a set of claims has a different scope. Therefore, for example, where a limitation is explicitly recited in a dependent claim, but not explicitly recited in any claim from which the dependent claim depends (directly or indirectly), that limitation is not to be read into any claim from which the dependent claim depends.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The term "consisting of" and variations thereof mean "including and limited to", unless expressly specified otherwise.

The terms "a", "an" and "the" mean "one or more", unless expressly specified otherwise.

The term "plurality" means "two or more", unless expressly specified otherwise.

The term "herein" means "in this patent application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like. It does not imply certainty or absolute precision, and does not imply that mathematical processing, numerical methods or an algorithm process be used. Therefore "determining" can include estimating, predicting, guessing and the like.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof. Thus a description of a process is likewise a description of an apparatus for performing the process. The apparatus can include, e.g., a processor and those input devices and output devices that are appropriate to perform the method. Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) are well known and could be used to store and manipulate the data types described herein. Likewise, object methods or behaviors of a database can be used to implement various processes, such as the described herein. In addition, the databases may, in a known manner, be stored locally or remotely from any device(s) which access data in the database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, or a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s). An Abstract has been included in this application merely because an Abstract of not more than 150 words is required under 37 C.F.R. §1.72(b).

The title of this patent application and headings of sections provided in this patent application are for convenience only, and are not to be taken as limiting the disclosure in any way.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a sequential order, such processes may be configured to work in different orders. In other words, any sequence or order of steps that may be explicitly described does not necessarily indicate a requirement that the steps be performed in that order. On the contrary, the steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

Unless expressly specified otherwise, an enumerated list of items (which may or may not be numbered) does not imply that any or all of the items are mutually exclusive. Therefore it is possible, but not necessarily true, that something can be considered to be, or fit the definition of, two or more of the items in an enumerated list. Also, an item in the enumerated list can be a subset (a specific type of) of another item in the enumerated list. For example, the enumerated list "a computer, a laptop, a PDA" does not imply that any or all of the three items of that list are mutually exclusive—e.g., an item can be both a laptop and a computer, and a "laptop" can be a subset of (a specific type of) a "computer".

Likewise, unless expressly specified otherwise, an enumerated list of items (which may or may not be numbered) does not imply that any or all of the items are collectively exhaustive or otherwise comprehensive of any category. For example, the enumerated list "a computer, a laptop, a PDA" does not imply that any or all of the three items of that list are comprehensive of any category.

Further, an enumerated listing of items does not imply that the items are ordered in any manner according to the order in which they are enumerated.

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application. Applicants intend to file additional applications to pursue patents for subject matter that has been disclosed and enabled but not claimed in this patent application.

What is claimed is:

1. A method performed by a computer, the method comprising:
    running, by a computer, a massive multiplayer online game that is operable to simultaneously support a plurality of players via a plurality of video game devices,
        in which each of the players controls at least one player character,
    providing, by the computer, a virtual environment wherein players can interact with each other and the environment via avatars;
    providing, by the computer, a mechanism whereby players can incur debts through financial transactions in the virtual environment;
    determining, by the computer, if a player has defaulted on a debt incurred in the virtual environment;
    providing, by the computer, a collections process whereby the player is forced to suffer a consequence until the debt is repaid,
        wherein the consequence is alteration of the physical appearance of the player's avatar.

2. The method of claim 1 wherein the alteration is an image attached to the avatar.

3. The method of claim 2 wherein the image is a ball and chain.

4. The method of claim 2 wherein the image includes indicia that provides information to other players regarding the current credit worthiness of the player whose avatar has been altered.

5. The method of claim 2 wherein the image is hyperlinked to the player's financial information such that other players can click on the hyperlink and determine financial information about the player.

6. The method of claim 1 wherein the consequence is banishment from one or more areas in the virtual environment.

7. The method of claim 1 further comprising
    allowing a virtual collections agency to mete out the consequence.

8. The method of claim 7 further comprising
    receiving bids from a plurality of virtual collections agencies for the right to repay some or all of the debt in return for the right to mete out the consequence to the player.

* * * * *